Header stripped

3,475,359
POLYALDEHYDE-POLYAMINE COATING COMPOSITION
Lowell O. Cummings, San Anselmo, Calif., assignor to Pacific Vegetable Oil Corporation, San Francisco, Calif., a corporation of California
No Drawing. Filed Oct. 13, 1966, Ser. No. 586,361
Int. Cl. C08g 9/04; C09g 9/06
U.S. Cl. 260—21
12 Claims

ABSTRACT OF THE DISCLOSURE

A novel coating and a method for applying the coating to a surface and rapidly curing the coating. Two reactive streams are simultaneously sprayed on the surface. One stream comprises as its main reactive ingredient a polyamine chosen from the group consisting of: (1) a tung acrolein adduct with each aldehyde group thereof reacted with one and only one amine group of a polyamine, leaving free amine groups for reaction with a polyaldehyde, (2) an amide-amine resin, (3) the partial reaction product of a polyamine and an epoxy resin, and (4) the reaction product of a lower polyamine and a methyl ester of a bodied drying oil. The other stream comprises as its main reactive ingredient a polyaldehyde chosen from the group consisting of: (1) tung acrolein adduct, (2) an alkyd of tung acrolein adduct, (3) glutaraldehyde, and (4) aldehyde oil, the number of amine groups being sprayed bearing a ratio to the number of aldehyde groups sprayed lying between about 4:1 to about 2:3.

---

This invention relates to an improved coating composition and to a method for making and applying the same.

There are many places where the slow cure or drying of paints and other coating compositions cause difficulties. Delay in cure or drying necessitates not only waiting but careful handling of freshly coated materials and space where they can be held apart from other bodies. Moreover, it is not always feasible to achieve rapid cure by baking. Some materials that are to be coated do not withstand baking well, and baking necessarily consumes power and entails later cooling.

The present invention relates to a system wherein the coating cures very rapidly at room temperature.

The system of this invention is very adaptable to use in a production line, where pieces are handled a few minutes after spraying.

The system of this invention does not require further processing to cure the film. Other types of finishes require long drying times, or baking for curing, or in a few cases very expensive curing processes such as electron beam curing or other forms of radiation curing.

As my new process does not require heat and cures rapidly, it is especially adaptable to use in coating wood pieces which are to be stacked. Wood is affected by heat and cannot be subjected to extensive baking without the risk of changing the wood properties. Up to now it has been difficult to obtain fast cured coating on wood without resorting to baking or more exotic curing systems such as radiation curing.

In coating wood with primers intended for exterior use, it is recognized that a primer with a vehicle containing vegetable oils (e.g. linseed oil) has the best durability and resistance to cracking. Oils have good flexibility and have unsurpassed resistance to cracking on wood. The primer recognized throughout the exterior wood paint industry as the standard of excellence is Federal Specification TT–P–25a, a linseed oil based primer. This primer takes about two days of air drying before it is suitable for topcoating. The lumber industry is now marketing pre-primed and pre-finished siding for the home builders. The lumber industry in cooperation with the paint industry has long been striving to develop a long lasting factory-applied primer for this siding.

Primers have already been in production which are based on short oil alkyds. These have been deficient in resistance to cracking, as shown by many actual exposures. Furthermore, with short oil alkyd primers, baking has been required in order to obtain fast enough cure so that the primed siding could be stacked without sticking together at the end of the production line. This baking has been undesirable but, with the short oil alkyds, has been unavoidable.

One of the main uses anticipated for the rapid-curing primer of this invention is for factory-applied wood priming. My new rapid-curing primer can be made from components which are made from drying oils and therefore can impart the same resistance to wood cracking, due to their oil-type flexibility, as conventional oil based air dry primers such as TT–P–25a.

On the other hand, my new rapid-curing primers can alternatively be made from more resinous components, such as alkyds and epoxy resin derivatives. These harder coatings are suitable for coating steel.

In fact these primers of this invention appear to give the steel rust resistance, due to amines in my new coating, for amines are known to aid rust resistance of coatings for steel.

There are many other instances where a rapid-cure no baking primer for steel or other metal is useful, e.g. where baking is to expensive or not permitted, in applications on exterior structures where no baking is available, and where rapid topcoating is desirable. All that is needed is two separate spray guns with their accompanying paint reservoirs. These coatings may also be useful in traffic paints where virtually no waiting period is necessary for the paint to dry before traffic can pass.

Other objects and advantages of the invention will appear from the following description of some preferred forms thereof.

Basically, the invention is a coating formed by spraying a surface simultaneously with (a) a polyamine and (b) a polyaldehyde.

POLYAMINES

A *polyamine*, as the term is used herein, means any organic radical which contains two or more amine groups. Two or more *primary* amine groups are required for the aldehyde-amine reaction, but either primary or secondary amine groups can be used in the polyanhydride, or polyisocyanate reactions.

The simplest polyamine is ethylene diamine, $H_2NCH_2CH_2NH_2$. Higher homologs of this are diethylene triamine, $H_2NCH_2CH_2NHCH_2CH_2NH_2$, and triethylene tetramine, $H_2NCH_2CH_2(NHCH_2CH_2)_2NH_2$. These simple polyamines can be used as the polyamine of this invention, but less volatile polyamines are better. For example, I have made high-molecular-weight polyamines that give excellent results herein by reacting tung acrolein adduct or epoxy resins with the simple polyamines shown above, where one aldehyde or epoxy group reacts with *only one* amine group of the polyamine, leaving one or more amine groups free.

The tung acrolein adduct reaction may be diagrammed as:

This reaction product is then condensed with a simple ployamine to get the higher molecular weight polyamine desired. For example, 50 grams of isopropyl alcohol, 100 grams of toluene, and 30.7 grams of triethylene tetramine are mixed in that order and to them are added slowly 100 grams of the tung acrolein adduct, all at room temperature and atmospheric pressure. The reaction takes about an hour to produce the desired polyamine.

An example of an epoxy resin-simple polyamine reaction to make a higher molecular weight polyamine is:

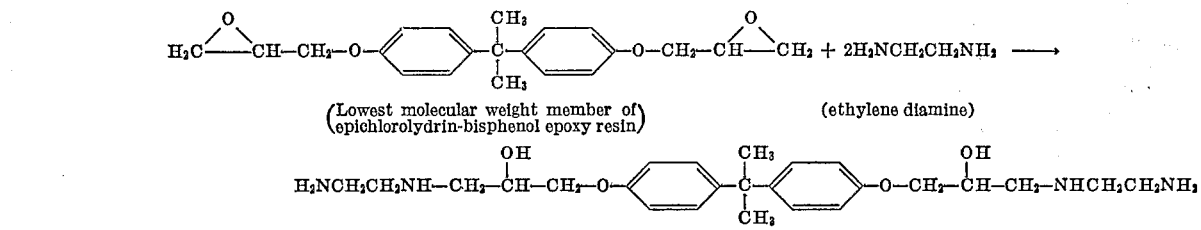

(Lowest molecular weight member of epichlorolydrin-bisphenol epoxy resin) (ethylene diamine)

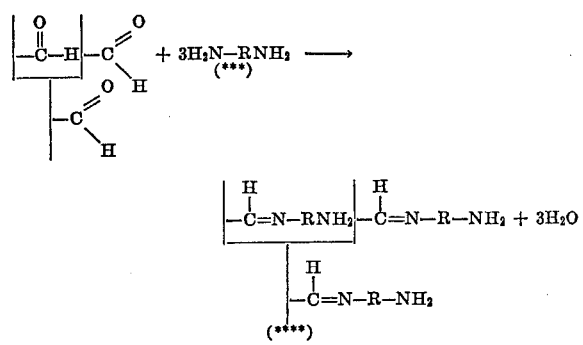

(\*\*\*) triethylene tetramine; (\*\*\*\*) tung oil acrolein polyamine. It is important to react one aldehyde with one amine group only of the polyamine. To react two amine groups gives a polymer rather than the desired high-molecular-weight polyamine.

The chemical reaction between an amine and an aldehyde is known as Schiff's base reaction, a powerful reaction which takes place rapidly at room temperature and goes very nearly to completion even in the presence of water. It will drive itself to completion in the presence of an excess of water, which is also a product of reaction. The reaction is illustrated in detail as:

Note that again only one amine group of each ethylene diamine is reacted with the epoxy group, in order to leave a free amine group. This reaction is not as vigorous as the Schiff's base reaction and does not take place rapidly at room temperature.

Another polyamine that works very well in the fast-curing coating reactions of this invention is the type of resin called a "poly-amide" resin. One brand of these is "Versamid" resins. In actuality, they are amide-amine resins made from reacting dimer fatty acids and simple polyamines such as ethylene diamine, diethylene, triamine, triethylene tetramine, and so on. These can be represented by:

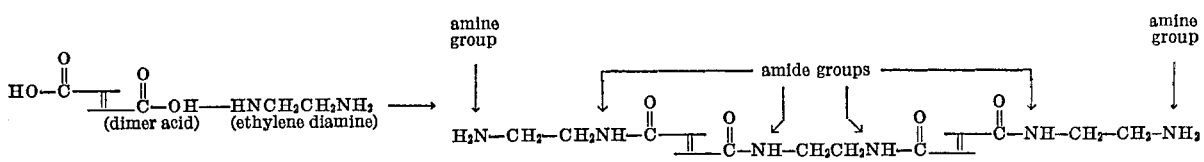

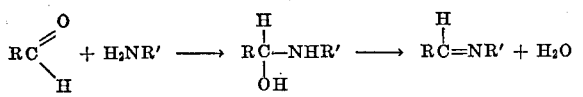

Example 1.—Making tung acrolein adduct 2500 g. tung oil is rapidly stirred in a glass kettle fitted with a reflux condenser. The oil is heated to 150° C. (302° F.) and 490 g. of acrolein is slowly added over an 18 hour period. The reaction gives a light tan oil, viscosity 9 strokes, Gardner color 6 to 7, acid value 3.9 and carbonyl equivalent of 0.198/100 g.

Another polyamine useful in this invention is made by reacting a bodied drying oil with methanol and then reacting the resulting methyl ester with a suitable amine.

Example 2.—Making a polyamine employing a methyl ester of a bodied safflower oil Safflower oil bodied to Z-8 Gardner-Holt viscosity is used, 3233 parts by weight being mixed with 610 parts by weight of methanol which contains 39 parts by weight of sodium hydroxide.

After thorough mixing for about thirty minutes in a kettle containing a reflux condenser and stirrer, in an inert atmosphere such as nitrogen, the mixture is neutralized, as by adding a mixture of 60 parts by weight of sulfuric acid and sixty parts by weight of water. The resulting mixture is allowed to settle, a lower layer then separates out, is drained off, and glycerine recovered therefrom.

The resulting methyl ester of bodied safflower oil is washed, as by washing with hot water three times, until the water layer is approximately neutral. The yield should be about 100% of the oil weight charged; the viscosity is A-2 Gardner-Holt and the color 5 to 7.

The methyl ester of bodied safflower oil is then charged to a kettle, preferably of stainless steel fitted with a stirrer, an inert gas inlet tube, a distilling condenser, and a methanol receiver. To 3040 parts by weight of the ester are added 960 parts by weight of triethylene tetramine, and the mixture is stirred and heated in four hours to about 210° C. with a gentle stream of nitrogen sparge. The yield of safflower oil methyl ester polyamine is 3650 parts by weight, with about 331 parts by weight of distillate.

The color of the polyamine is 7–, its viscosity is Z–7 to Z–8, its amine number is about 200 (plus or minus 10), its specific gravity is .95 or 7.82 pounds per gallon.

THE POLYALDEHYDES

A *polyaldehyde*, as the term is used in this invention, is any organic radical which contains two or more aldehyde $$(-\overset{O}{\overset{\|}{C}}-H)$$

groups. An example is glutaraldehyde, $$H-\overset{O}{\overset{\|}{C}}-CH_2-CH_2-CH_2-\overset{O}{\overset{\|}{C}}-H$$

a simple dialdehyde. Although glutaraldehyde can be used in the above reaction, it is not as suitable as a less volatile polyaldehyde such as the adduct of tung oil and acrolein. This adduct is the Diels-Alder condensation of tung oil, a conjugated triene, and acrolein, a dienophile.

$$(CH_3(CH_2)_3CH=CH-CH=CH-CH=CH(CH_2)_7\overset{O}{\overset{\|}{C}}-O)_3R + 3CH_2=CH\overset{O}{\overset{\|}{C}}-H \longrightarrow$$

tung oil, 80-85% Trieleostearic acid glyceride     acrolein $$\left[ CH_3(CH_2)_3CH=CH-\underset{\underset{CH=CH}{\diagdown\diagup}}{\overset{\overset{CH_2-CH}{\diagup\diagdown}}{CH}}\overset{C=O}{\underset{H}{\diagdown}}\quad \overset{\overset{CH_2-CH}{\diagup\diagdown}}{\underset{CH=CH}{\diagdown\diagup}}\underset{HC(CH_2)_7-C\overset{O}{\overset{\|}{O}}}{}R \right]_3$$

where R is esterified glycerol. The position of the left hand double bond can be on the right hand side of the ring, and the aldehyde group can also be on the adjacent carbon to the left.

POLYMER FORMATION FROM A POLYALDEHYDE AND A POLYAMINE

The polymeric coating of the invention may be made by Schiff's base type reaction, represented by:

$$H\overset{O}{\overset{\|}{C}}(R\overset{O}{\overset{\|}{C}}H)_n + H_2N-R'-NH_2 \longrightarrow$$

$$H\overset{O}{\overset{\|}{C}}-R\overset{H}{\overset{|}{C}}=N-(R-N=\overset{H}{\overset{|}{C}}R\overset{H}{\overset{|}{C}}=N)_xR=NH_2 + XH_2O$$

(n=1 or more). This is only diagrammatic. The end groups could be either $$H\overset{O}{\overset{\|}{C}}-$$

or NH$_2$ on both or either end, depending on whether one ingredient is in slight excess of the other. Preferably, the equivalents of aldehyde groups and amine groups are present in approximately equal amounts by weight, but the ratio of amine groups to aldehyde groups may vary from 4:1 to 1:1.5.

THE METHOD OF APPLYING THE COATING

To explain the mode of the reaction as presently understood, the two reactants are mixed as quickly and as thoroughly as possible in a few seconds. During this mixing, the reactants are at first mutually soluble in each other for a brief instant and then they start to form a polymer. The polymer forms spontaneously at room temperature. In the polyaldehyde-polyamine reaction a small amount of water is evolved as a reaction byproduct. This manifests itself at times by making the bulk polymer cloudy. In a thin film the cloudiness due to water is seldom seen, probably because of fast evaporation.

To test the reactants quickly, one of the reactants may be weighed into a small container, such as a paper cup or beaker. Then the second reactant is weighed into the same container, being careful not to mix the components. Then the components are mixed with a spatula as rapidly and as thoroughly as possible. Within 10 seconds of mixing the mixture becomes very viscous, and within less than a minute the mixture becomes completely gelled and impossible to stir.

The above test indicates the suitability of the reactants to be used as a coating. Films of these reactants are preferably made by simultaneously spraying the two components from two separate spray guns on the same area.

The sprayed droplets of the two components first mix and form a film on the sprayed surface, or perhaps some droplets mix while still traveling in the air. The film begins to harden almost at once. Typically the film will become solid and cured enough to be handled in a minute or two at room temperature.

The components are usually dissolved in a suitable solvent to give the optimum spraying properties. Usually the spraying viscosity is quite low. Much of the solvent evaporates in the spray, and the remainder evaporates from the film. The film hardens even though there is some solvent remaining. The evaporation of the solvent can be hastened by a heat source heating the film, but this is not necessary.

While clear coatings are quite good with this system, either of the two components can, of course, be pigmented to give paints. After suitable formulating, the resulting paints have the appearance of conventional paint.

Example 3.—Reaction of tung-acrolein adduct with amid-amine dimer acid resin in bulk Tung acrolein adduct may be reacted with the Versamid resins mentioned earlier, such as Versamid 140, a dark yellow, clear viscous liquid with an amine number range of 350–400 (equivalent to one amine group per 140–160 molecular weight).

In making test mixtures in small containers, the ingredients are poured in separately and then mixed rapidly with a spatula.

| Parts by weight | | | |
|---|---|---|---|
| Tung Acrolein Adduct | Versamid 140 | Time To Gel | Type of Gel |
| 10 | 5 | 10–30 secs. | Stretchable, tough, soft, rubbery solid. |
| 10 | 10 | 10–30 secs. | Tough, bouncy, semi-hard solid. |

Example 4.—Making quick-curing film from the Example 3 ingredients by spraying

Solutions of the above may be made as follows:
(A) 100 parts by weight of Versamid 140, 50 parts by weight of isopropanol, and 50 parts by weight of toluene.
(B) 100 parts by weight of tung acrolein adduct and 100 parts by weight of toluene. Two conventional paint spray guns may be used. The reservoir of one gun is filled with solution (A) and the other with solution (B). These are connected to air lines with 30 lbs./sq. inch pressure. The guns are attached together so that their nozzles are ponted toward the same point about three inches in front of the nozzles. Each gun is adjusted so that each sprays out 60 grams of solution per minute. Then they are sprayed at the same time on a test panel, holding the guns about 3" from the panel. A film of combined (A) and (B) forms immediately on spraying, and it starts to turn to a solid in ten seconds, becoming a soft solid film within thirty seconds. The film becomes progressively harder, and three minutes after spraying the film appears to be well cured.

Example 5.—Quick curing film from tung acrolein adduct and a polyamine from tung acrolein combined with ethylene diamine The polyamine in this example, explained above, is made by adding to a stirred glass kettle in the order given:

| Parts by wt.: | Ingredients |
|---|---|
| 200 | Isopropyl alcohol. |
| 24 | Ethylene diamine, 98%. |
| 172 | Tung acrolein adduct. |

This is solution (A) for this reaction. Solution (B) from Example 7 is sprayed along with this solution (A) in the same manner as in Example 7. The same type of film develops with the same characteristics as in Example 7.

Example 6.—Tung acrolein adduct made into an alkyd

An alkyd composed of 80% tung acrolein adduct, 18% glycerol phthalate and 2% glycerol is made by heating 400 parts by weight tung acrolein adduct and 39 parts by weight glycerol (99%) in a flask fitted with a stirrer, inert gas inlet tube and thermometer, to 200° C., adding 0.1 part by weight of litharge, heating to 230° C. and holding at this temperature under a blanket of inert gas until one part of the product is soluble in one part methanol. Then 69.5 parts by weight of phthalic anhydride are added and the reaction held at about 220° C. while a slow stream of inert gas carries off the water formed. In three hours the acid number is 7.1, and the reaction may be discontinued. The resulting alkyd has the following properties:

| | |
|---|---|
| Viscosity | 246 seconds, Z6+½ |
| Acid value | 7.1 |
| Color (Gardner) | 11 |

Example 7.—Tung acrolein adduct alkyd reacted with polyamine from tung acrolein adduct ethylene diamine condensate The alkyd from Example 6 is dissolved in equal weight of toluene; this was solution (B) for this example. Solution (A) is made by adding to a stirred flask in order shown in the following:

| Parts by wt.: | Ingredients |
|---|---|
| 75 | Isopropanol. |
| 75 | Toluene. |
| 17 | Ethylene diamine, 98%. |
| 150 | Tung acrolein adduct. |

When these are sprayed in the same manner as shown in Example 5, the cure rates are about the same, but the films are somewhat harder than the films from Example 4 or Example 5.

Example 8.—A polyaldehyde-polyamine curing system in emulsion form

Another system of combining (A) and (B) in a film and keeping them separate before application, is by emulsifying each component and combining the component emulsions. This mixture still contains separate unreacted particles of (A) and (B) which only combine when the emulsion is formed in a film and the water evaporates, forcing the droplets to fuse with one another and to react to form a cured film.

(A) Emulsion of Genamid 250, an amine-amid resin with an amine number of 425-450. 45 parts by weight of water and 21.5 parts by weight of 70% solution nonyl phenol polyethylene glycol condensate (100 ethylene glycol units) are mixed, and 300 parts by weight of Genamid 250 are added slowly. Then 1400 parts by weight of water are added, giving a viscous emulsion of fine particle size.

(B) Emulsion of tung acrolein adduct, 45 parts by weight of water and 21.5 parts by weight of 70% solution nonyl phenol polyethylene glycol condensate (100 ethylene glycol units) are premixed, and 300 parts by weight of tung acrolein adduct are slowly added. The mixture is let down with 400 parts by weight of water to make an oil-in-water emulsion, 1 to 5 micron particle size.

100 parts by weight of (A) emulsion and 50 parts by weight of (B) emulsion are mixed and laid down on a glass plate in a film about 0.0005 to 0.002" thick. The instant that the water evaporates a clear oil film is deposited. The film is first quite fluid, and then starts to thicken in viscosity. The gaining of viscosity at room temperature continues for about 30 minutes, at which time the film is cured. The cured film is not liquid in the least and resembles an air-dried vegetable oil film in properties.

Example 9.—Lower molecular weight polyaldehydes reacted with various polyamines

This example illustrates that polyaldehyde and polyamines form polymers as a general reaction, if conditions are held so that about one aldehyde group reacts with about one primary amine group. In the following instances the two reactants are poured into the same container and then rapidly stirred with a spatula. The resulting gel was examined for properties described. All parts are by weight.

| A | B |
|---|---|
| 0.3 parts ethylene diamine | 4 parts of a 25% water solution of glutaraldehyde. |

Gave a white precipitate at once which congealed into a fairly hard gel.

| | |
|---|---|
| 0.75 part diethylene triamine | 4 parts of a 25% water solution of glutaraldehyde. |

Made a fairly hard white-pink porous gel in a few seconds.

| | |
|---|---|
| 1.0 part triethylene tetramine | 5 parts of a 25% water solution of glutaraldehyde. |

When the amine was added the solution remained clear a few seconds, then became cloudy and gelled to a pinkish mass. This was a very tough porous polymer.

| | |
|---|---|
| 10 parts of a polyamine solution made by reacting epoxy resin and ethylene diamine. See Example 1, second part. | 5 parts of a 25% water solution of glutaraldehyde. |

Made a white gel. Quite rubbery.

| | |
|---|---|
| 1 part triethylene tetramine | 5 parts of an aldehyde oil that was produced from the reaction of ozone on soy oil. This was largely a triglyceride of C9 esterified fatty acids which had a terminal aldehyde group. Carbonyl equivalent 0.239/100 g., acid value 29.8 |

Made a solid yellow gel. Somewhat tough.

| | |
|---|---|
| 10 parts tung oil acrolein adduct condensed with triethylene tetramine 50% solution. See Example 1. | 5 parts aldehyde oil (above). |

Somewhat flexible gel. Could be stretched slowly.

| | |
|---|---|
| 10 parts polyamine solution made by reacting epoxy resin and ethylene diamine. | 5 parts aldehyde oil (above). |

Somewhat cheesy sticky resin.

| | |
|---|---|
| 2 parts hexamethylene diamine | 5 parts 40% solution glyoxal in water. |

Makes very hard white polymer.

| | |
|---|---|
| 2 parts hydrazine hydrate | 5 parts 40% solution glyoxal in water. |

Gave very hard yellow polymer with evolution of considerable heat.

Example 10

The 1:1 ratio of aldehyde-to-amine groups appears to be preferable generally, but the ratio may be varied, and for some instances different proportions may be preferable for one reason or another. The ratio of amine groups to aldehyde groups may vary from 4:1 to 2:3 and still give a satisfactory coating. The limits are indicated by the following preparations where various relative amounts of the tung acrolein adduct (of Examples 1 and 3) was used as the aldehyde and the polyamine of the methyl ester of bodied safflower oil (of Example 2) was used as the amine; the test panels were standard cardboard paint-out charts. Both ingredient were simultaneously sprayed by spray guns, having been diluted as shown in Example 4. Beyond the determined limits, as stated above, the two-spray system fails to form a non-liquid film, producing merely a viscous liquid which would flow, as would either of the components by itself for they themselves are viscous liquids.

Amine-aldehyde ratio
of groups:        Results
(a) 1:1 _____ Tough, glossy, tacky film with very good adhesion to the test panel.
(b) 1.9:1 _____ Somewhat softer than (a) but otherwise about the same.
(c) 3.6:1 _____ Tackier and softer than (a).
(d) 1:1.35 ____ Very tacky but non-liquid film.
(e) 1:2.5 _____ No film—liquid.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A cured coating comprising the reaction product of the reaction between
   (a) a polyamine and
   (b) a polyaldehyde,
   with the ratio of amine groups to aldehyde groups lying between about 4:1 and about 2:3,
   said polyamine (a) being chosen from the group consisting of
      (1) a tung acrolein adduct with each aldehyde group thereof reacted with one and only one amine group of a polyamine, leaving free amine groups for reaction with said polyaldehyde,
      (2) an alkyd of tung acrolein adduct,
      (3) the partial reaction product of a polyamine and an epoxy resin, and
      (4) the reaction product of a lower polyamine and a methyl ester of a bodied drying oil,
   and polyaldehyde (b) being chosen from the group consisting of
      (1) tung acrolein adduct,
      (2) an alkyld of tung acrolein adduct,
      (3) glutaraldehyde, and
      (4) the aldehyde oil produced by the reaction of ozone on soy oil.

2. The coating of claim 1 wherein the equivalents of the amine groups and the aldehyde groups are in approximately equal amounts.

3. The coating of claim 1 wherein there is also a pigment carried by at least one of (a) or (b).

4. The coating of claim 1 wherein said polyamine is a Schiff's base reaction product of tung-acrolein adduct and triethylene tetramine.

5. The coating of claim 1 wherein said polyamine comprises an amide-amine dimer acid resin.

6. The coating of claim 1 wherein said polyamine is the reaction product of a polymerized fatty acid and ethylene diamine.

7. The coating of claim 1 wherein said lower polyamine is triethylene tetramine and said drying oil is safflower oil bodied to a Z-8 viscosity.

8. A method for applying a coating to a surface and rapidly curing the coating comprising
   simultaneously spraying on said surface two reactive streams,
   one said stream comprising as its main reactive ingredient a polyamine chosen from the group consisting of:
      (1) a tung acrolein adduct with each aldehyde group thereof reacted with one and only one amine group of a polyamine, leaving free amine groups for reaction with a polyaldehyde,
      (2) an amide-amine resin,
      (3) the partial reaction product of a polyamine and an epoxy resin, and
      (4) the reaction product of a lower polyamine and a methyl ester of a bodied drying oil,
   the other said stream comprising as its main reactive ingredient a polyaldehyde chosen from the group consisting of:
      (1) tung acrolein adduct,
      (2) an alkyd of tung acrolein adduct,
      (3) glutaraldehyde, and
      (4) the aldehyde oil formed by the reaction of ozone on soy oil,
   the number of amine groups being sprayed bearing a ratio to the number of aldehyde groups sprayed lying between about 4:1 to about 2:3.

9. The method of claim 8 wherein at least one said stream contains pigment.

10. The method of claim 8 wherein both said streams include solvent for reducing the viscosity of its ingredients to a level compatible with spraying.

11. The method of claim 8 wherein both said streams are emulsions having a viscosity suitable for spraying.

12. The method of claim 8 wherein for each amine group there is aproximately one aldehyde group.

References Cited

UNITED STATES PATENTS

| | | | |
|---|---|---|---|
| 3,329,657 | 7/1967 | Strazdins et al. | 260—72 |
| 1,737,391 | 11/1929 | Scott | 260—72 |
| 2,140,258 | 12/1938 | Clifford | 260—72 |
| 2,205,355 | 6/1940 | Grimm et al. | 260—72 |
| 2,276,309 | 3/1942 | Hummel et al. | 260—21 |
| 2,568,426 | 9/1951 | Whetstone et al. | 260—23 |
| 3,306,953 | 2/1967 | Fourcade et al. | 260—18 |
| 3,308,076 | 3/1967 | De Lia et al. | 260—18 |
| 3,326,098 | 6/1967 | Boettler | 260—22 |

FOREIGN PATENTS 924,423   4/1963   Great Britain.

OTHER REFERENCES

Ser. No. 395,732, Alien Property Custodian, published Apr. 20, 1943, Kern, copy in 260—72.

DONALD E. CZAJA, Primary Examiner

R. W. GRIFFIN, Assistant Examiner

U.S. Cl. X.R.

117—105.5, 124, 132, 134, 148, 161, 167; 260—22, 33.4, 33.6, 39, 40, 72

PO-1050
(5/69)

UNITED STATES PATENT OFFICE
CERTIFICATE OF CORRECTION

Patent No. 3,475,359      Dated October 28, 1969

Inventor(s) Lowell O. Cummings

It is certified that error appears in the above-identified patent and that said Letters Patent are hereby corrected as shown below:

Column 2, line 42, "to expensive" should read --too expensive--; line 62, delete the comma after "polyanhydride"; Column 3 line 74, "strokes" should read --stokes--; Column 6, line 73, "ponted" should be --pointed--; Column 9, line 51, the line in its entirety should read --(2) an amide-amine resin,--; line 56, "and" should read --said--; Column 10, line 10, insert a comma after "coating".

SIGNED AND
SEALED
JUN 30 1970

(SEAL)
Attest:

Edward M. Fletcher, Jr.
Attesting Officer

WILLIAM E. SCHUYLER, JR.
Commissioner of Patents